United States Patent
Bourret et al.

(10) Patent No.: US 7,639,154 B2
(45) Date of Patent: Dec. 29, 2009

(54) PROCESS AND DEVICE FOR REGULATING THE LUMINOUS INTENSITY OF INDICATOR LIGHTS OF A PIECE OF MONITORING AND CONTROL EQUIPMENT IN AN AIRPLANE COCKPIT

(75) Inventors: Thierry Bourret, Toulouse (FR); Laurent Goutal, Toulouse (FR); Vincent Lautridou, Colomiers (FR)

(73) Assignee: Airbus France, Toulouse (FR)

( * ) Notice: Subject to any disclaimer, the term of this patent is extended or adjusted under 35 U.S.C. 154(b) by 376 days.

(21) Appl. No.: 11/613,488

(22) Filed: Dec. 20, 2006

(65) Prior Publication Data

US 2007/0159005 A1 Jul. 12, 2007

(30) Foreign Application Priority Data

Dec. 20, 2005 (FR) .................................. 05 53975

(51) Int. Cl.
*G08B 5/00* (2006.01)

(52) U.S. Cl. .............................. 340/815.4; 340/815.43; 340/815.45; 340/815.53; 340/945; 340/971; 250/553; 362/464; 362/471; 362/511; 362/312

(58) Field of Classification Search ............. 340/815.4, 340/815.43, 815.45, 815.53, 945, 971; 250/553; 362/464, 471, 511, 612
See application file for complete search history.

(56) References Cited

U.S. PATENT DOCUMENTS

| 4,324,986 | A | 4/1982 | Hara et al. |
| 4,904,991 | A | 2/1990 | Jones |
| 7,485,886 | B2 * | 2/2009 | Nakajima ................... 250/553 |
| 2004/0110206 | A1 * | 6/2004 | Wong et al. ................... 435/6 |

FOREIGN PATENT DOCUMENTS

| DE | 44 09 777 A1 | 9/1995 |
| DE | 103 55 609 B3 | 7/2005 |

* cited by examiner

*Primary Examiner*—Tai T Nguyen
(74) *Attorney, Agent, or Firm*—Perman & Green LLP (57) ABSTRACT

In order to adjust the luminance of indicator lights of a piece of monitoring and control equipment for an airplane, the control for regulating luminous intensity of legends and displays is used to act on the luminance value of the indicator lights. When the indicator lights are illuminated in a "day" mode, the luminance of the indicator lights is independent from the regulation of the luminous intensity of legends and displays. When the indicator lights are illuminated in a "night" mode corresponding to a reduced luminance of the indicator lights relative to the "day" mode, the luminance of the indicator lights can take at least two values according to the luminous intensity regulation value of the legends and displays.

13 Claims, 5 Drawing Sheets

PROCESS AND DEVICE FOR REGULATING THE LUMINOUS INTENSITY OF INDICATOR LIGHTS OF A PIECE OF MONITORING AND CONTROL EQUIPMENT IN AN AIRPLANE COCKPIT

CROSS-REFERENCE TO RELATED APPLICATIONS

This application claims priority from French Patent Application No. 05 53975 filed on Dec. 20, 2005.

BACKGROUND

1. Field

The disclosed embodiments relate to a process and a device for regulating the luminous intensity of indicator lights of a piece of monitoring and control equipment of a plane when this equipment has displays and indicator lights whose luminous emission sources can be of several types and/or whose luminous intensities must vary in different ways in order to make them easily readable.

2. Brief Description of Related Developments

Monitoring and control equipment in cockpits of airplanes include various control means, generally grouped by functional category, such as switches, push-buttons or selectors often combined with legends, to indicate the function of these different controls and display means, such as digital or alphanumeric value displays and indicator lights. For purposes of assuring that the legends, displays and indicator lights can be easily read under variable lighting conditions linked to the cockpit environment, monitoring and control equipment generally have illumination means, most often consisting of light sources internal to the monitoring and control equipment, to render readable the data displayed on the visible face of this equipment, in particular when the ambient luminosity is low and no longer sufficient to assure correct readability. Indicator lights or displays are considered well readable if, on the one hand, the flight crew can read them comfortably and, on the other hand, the data that said indicator lights or displays present is clear and unambiguous.

Since external lighting conditions vary in significant proportions, for example, between high daytime luminosity, in full sun or under clouds, and the dark of night when the cockpit is poorly lit or unlit, the illumination means for the monitoring and control equipment most often have means for regulating the luminous intensity of legends and displays of this said monitoring and control equipment.

In modern airplanes, these illumination means can use light sources of different types. These light sources are most often of the incandescent or electroluminescent type, in particular, by means of so-called LED diodes. They are used, in particular, to illuminate legends engraved on plates placed on the visible face of the monitoring and control equipment, for lighting numerical or alphanumeric read-outs such as those of liquid crystal displays, [and] for illuminating the legends of luminous push-buttons.

Luminous push-buttons are often pulse controls that generally have a legend over part of their visible surface, for example the lower half, to indicate the function of the push-button.

The other part of the visible surface of the push-buttons generally incorporates a luminous indicator whose lighting device can be integrated inside the luminous push-button. These indicator lights light up to inform the pilot of the status of the function controlled by the corresponding push-button. For example, in such control equipment that permits activating automatic airplane pilots, a push-button used to engage an automatic pilot is lit up when a pilot presses the push-button and the corresponding automatic pilot is engaged. This luminous push-button will turn off if the corresponding automatic pilot is disconnected, whether it is disconnected by a pilot or by any automatic means whatever, so that pilots have information feedback on the status of the function in question directly at the level of the control itself, comprised of the push-button. The lighting and luminous intensity of the luminous push-button legend are independent of the on or off state of the push-button indicator light.

Other indicator lights can be used on the equipment. For example, in order to inform the pilot of the status of certain parameter selections, for example, speed for the needs of the automatic handle of the engine thrust regulator, the indicator light associated with the speed selector will be in a state of illumination when the parameter is active and will be turned off when it is not.

Indicator lights associated with luminous push-buttons or with selectors are often green in color when they are illuminated. This color is frequently used in a conventional manner to indicate normal system functioning.

Due to the diversity of these light-emitting elements and the variety of their light sources, it is difficult to satisfactorily regulate the lighting of all the legends, displays, and indicator lights of a piece of monitoring and control equipment by means of a single regulation control. The majority of current planes have two or more independent controls that permit pilots to adjust the luminous intensity of the different light sources on said monitoring and control equipment in an independent manner, as a function of readability constraints.

Since readability constraints are different for legends and for indicator lights, and in practice these constraints are greater for legends, certain airplanes have a continuous control for regulating the lighting of legends on plates and displays and another two-position control to select between two predetermined values of luminous intensity for luminous push-button and selector indicator lights. For this other control, a first position called "day" corresponds to a high luminosity of the indicator lights of luminous push-buttons and selectors so they can be read under conditions of high ambient luminosity, and a second position called "night" or "DIM" corresponds to a reduced luminosity of these indicator lights for conditions of reduced ambient luminosity.

Nevertheless, for this second "night" position, the necessary compromise between conditions of semi-darkness and conditions of complete night lead to retaining a luminous intensity for the indicator lights of luminous push-buttons and selectors that can prove to be relatively high under conditions of complete darkness and relatively low under conditions of semi-darkness relative to guaranteeing a satisfactory visual comfort for the pilots. Moreover, in modern airplanes, the number of luminous push-buttons whose indicator lights can be illuminated simultaneously and can be found in the visual field of the pilots can be high; as a result, an increase in the discomfort of the pilots when they wish to observe what is going on outside the plane through the windshield.

SUMMARY

In order to remedy these disadvantages without introducing new work for the flight crew, a process for regulating the luminosity of at least one indicator light is proposed, when this at least one indicator light is in an illuminated state, for a piece of monitoring and control equipment of an airplane, by receiving the order from a first control for regulation, which is roughly continuous or has relatively small increments, of the luminous intensity of at least one legend or at least one display of said equipment and receiving the order from a second control for switching the luminosity intensity of at least one indicator light of said equipment between at least two modes, corresponding to at least two distinct levels of luminous intensity of said at least one indicator light, so that, for at least one of the two modes selected by means of the second control, a different value is given to the luminance of the at least one indicator light depending on whether a controlled luminous intensity value ILcd of the at least one legend or of the at least one display controlled by the first control is tested [to determine] whether it is greater or less than a predetermined threshold value ILthreshold.

In a preferred implementation of the process, the luminance value of the at least one indicator light is independent of the controlled luminous intensity value ILcd determined by the first control for at least one of the modes selected by the second control so that the luminosity of the at least one indicator light is a value imposed when lighting conditions are such that regulation of the lighting intensity of the at least one legend or of the at least one display is not essential for the flight crew.

In this preferred embodiment, advantageously, the luminance of the at least one indicator light independent of the controlled luminous intensity value ILcd for at least one of the modes selected by the second control switch has a value greater than that of the luminance of the at least one indicator light that depends on the controlled luminous intensity ILcd for at least one of the other modes selected by the second control switch. Thus, under conditions of high ambient luminosity, for which the at least one legend or the at least one display is generally readable without internal lighting, is sufficient for the state of said indicator light to be readable.

In a preferred method of implementation of the process, when at least one of the modes, for which a different value is given to the luminance of the at least one indicator light depending on whether the controlled luminous intensity value ILcd of the at least one legend or of the at least one display controlled by the first control is tested [to determine] whether it is greater or less than a predetermined threshold value ILthreshold, is selected by the second control switch, the luminance of the at least one indicator light takes a first value when the controlled luminous intensity value ILcd is greater than the threshold value ILthreshold and takes a second value, which is lower than the first, when the controlled luminous intensity ILcd is less than the threshold value ILthreshold.

Advantageously, in order to improve the stability of switching between luminous intensity levels, when at least one of the modes, for which a different value is given to the luminance of the at least one indicator light depending on whether the luminous intensity value ILcd of the at least one legend or of the at least one display controlled by the first control is tested [to determine] whether it is greater or less than a predetermined threshold value ILthreshold, is selected by the second switch control, [a value] between the first luminance value and the second luminance value, the change in the luminance of the at least one indicator light is carried out when the threshold value ILthreshold is reached when the controlled luminous intensity is modified in the direction of decrease, and is carried out when a threshold value ILthreshold-sup, which is different from the ILthreshold value, is reached when the controlled luminous intensity ILcd is changed in the direction of decrease.

The aspects of the disclosed embodiment also concern a piece of monitoring and control equipment for an airplane that can implement the process and having:

at least one legend or at least one display that can be illuminated;

at least one indicator light having lighting means that can be illuminated or turned off;

means, which are dedicated or shared with other equipment, for regulating, roughly continuously or with increments of relatively small values, the luminous intensity of the at least one legend or of the at least one display;

switching means, which are dedicated or shared with other equipment, for switching between at least two luminous intensity states of the at least one indicator light when said indicator light is in an illuminated state;

and also having variable electrical supply means designed to supply the lighting means of the at least one indicator light with voltages and currents that confer:

a first luminance to the at least one indicator light, which [luminance] is roughly constant, when the switching means is in a first state, and a second luminance to the at least one indicator light, which [luminance] is roughly constant, and is less than the first luminance, when the switching means is in a second state, and the means for regulating the luminous intensity determines a controlled luminous intensity ILcd of the at least one legend or of the at least one display that is greater than a predetermined threshold value ILthreshold, and a third luminance to the at least one indicator light, which [luminance] is roughly constant, and is less than the first luminance and the second luminance, when the switching means is in the second state, and the luminous intensity regulating means determines a controlled luminous intensity ILcd of the at least one legend or of the at least one display that is less than a predetermined threshold value ILthreshold.

According to a preferred embodiment of the equipment, the means for switching between at least two states of luminous intensity of the at least one indicator light when said indicator light is in the illuminated state has a selector with at least two positions called "day" and "night".

In one particular embodiment of the equipment, at least one indicator light is incorporated in a luminous push-button.

Preferably, the luminances of the indicator lights are comprised between 2 cd/m$^2$ and 500 cd/m$^2$, and, in particular, the luminances of said indicator lights are roughly in a ratio of 5% to 10% for the second luminance relative to the first luminance and approximately 2% for the third luminance relative to the first luminance.

Advantageously, the luminance of the indicator lights is adapted to the luminous emission surface of said indicator lights, to assure a homogenous luminous appearance of the visible face of the equipment.

The aspects of the disclosed embodiments concern any airplane using such a process and/or having such a device for regulating the luminosity of at least one piece of monitoring and control equipment.

BRIEF DESCRIPTION OF THE DRAWINGS

The description that follows of one preferred aspect of the disclosed embodiments is made in reference to the following illustrations.

DETAILED DESCRIPTION OF THE DISCLOSED EMBODIMENTS

Figure 3:
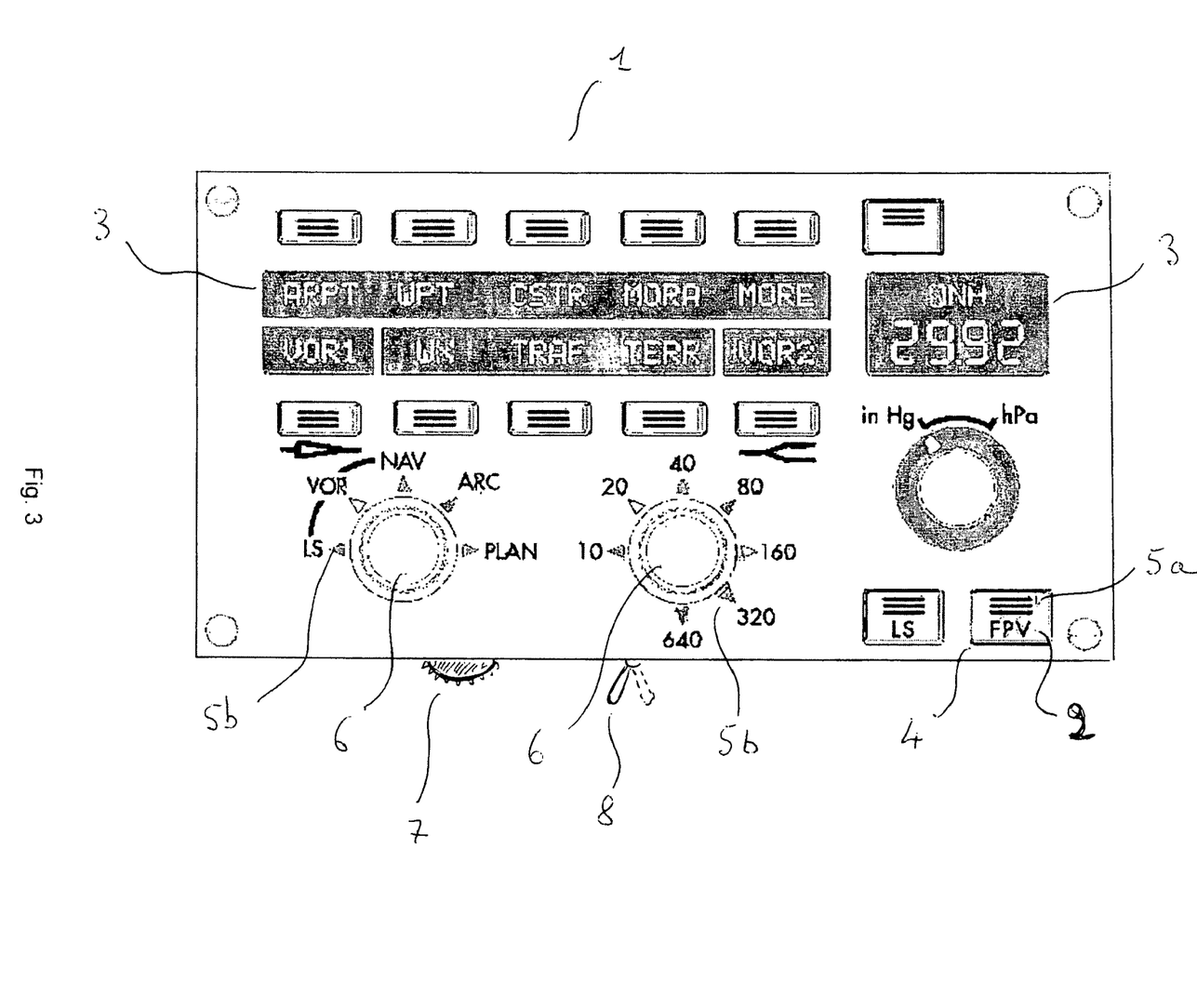
FIG. 3: general presentation of the visible face of an example of airplane cockpit equipment designed to be mounted on a glare shield above the dashboard and below the lower frame of the windshield.

In a known manner, a piece of monitoring and control equipment 1 of an airplane is associated with a device for regulating the luminous intensity of legends 2, displays 3 and indicator lights 5a, 5b of its visible face, which regulating device has, on the one hand, a control 7 for regulation, which is roughly continuous or with very small increments, so as to give the impression of a roughly continuous regulation, between two extreme luminance values of at least one legend 2 of said piece of monitoring and control equipment 1 and/or of the luminance of at least one display 3 installed on this piece of monitoring and control equipment 1 and has, on the other hand, a second control 8 with at least two positions to select the luminance LV of at least one indicator light 5a of a luminous push-button 4 or of at least one indicator light 5b for a selector 6 of said piece of monitoring and control equipment 1 between two predefined luminance levels, i.e., a first position 20 called "day", corresponding to a first luminance level LV-day 21, and a second position 22 called "night", corresponding to a second luminance level, which is lower than the first luminance level LV-day 21 for the "day" position 20.

For clarity of the disclosure, the process for regulating the luminous intensity, as well as a corresponding device according to the aspects of the disclosed embodiments, are described for a piece of monitoring and control equipment, such as is illustrated in FIG. 3, for example, a control panel for a navigation display situated in front of the pilot under the windshield frame. However, according to the aspects of the disclosed embodiments, said device for regulating luminous intensity and/or first control 7 and/or second control 8 can also be common to an assembly of equipment for the cockpit.

Figure 1:
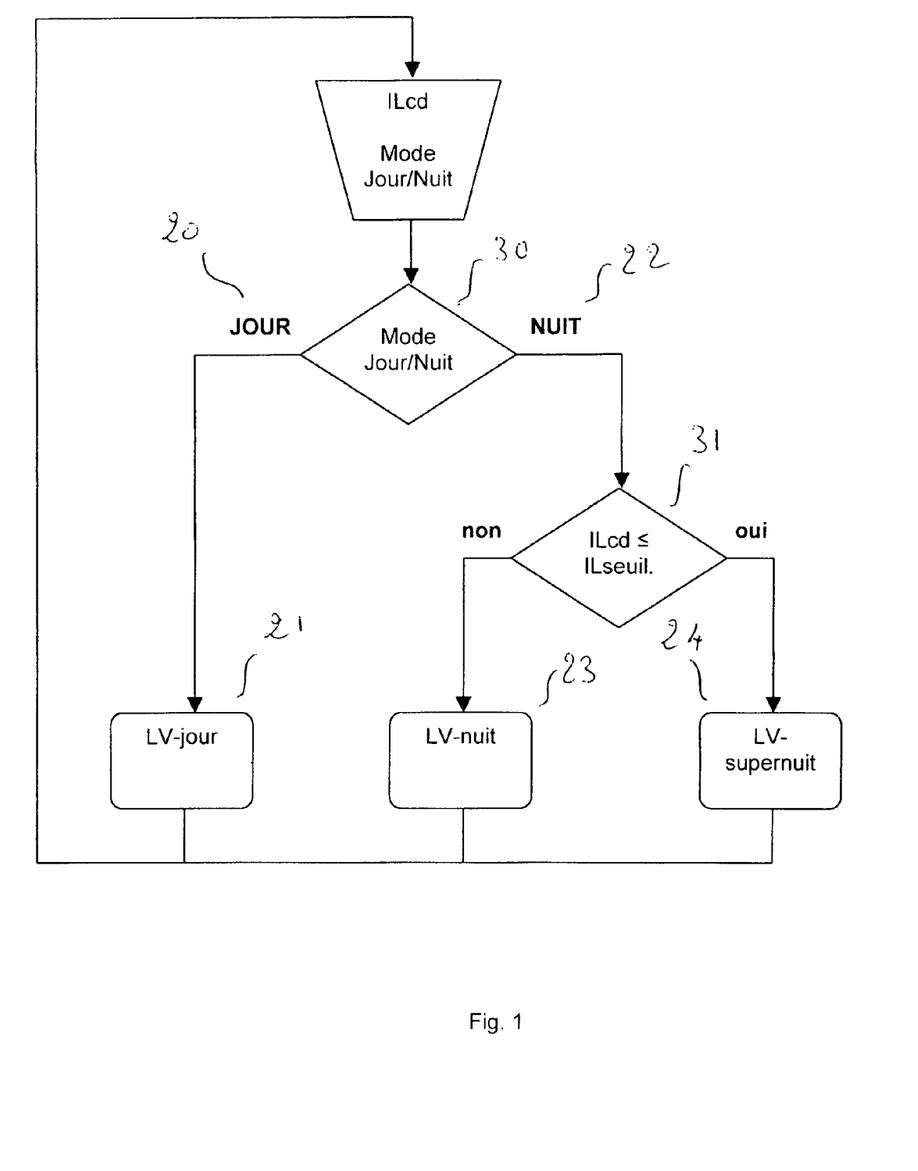
FIG. 1: flow chart of the principle of the process for regulating the luminous intensity of indicator lights of airplane equipment.

The process according to the aspects of the disclosed embodiments, whose logic diagram of the principle is given in FIG. 1, consists of automatically reducing the luminous intensity of the at least one indicator light 5a, 5b of a luminous push-button 4 or of a selector 6 from a luminance level LV-night 23 to a luminance level LV-supernight 24, which is lower than level LV-night 23, when, on the one hand, the two-position second control 8 for regulating the luminous intensity of the at least one indicator light 5a, 5b is in position 22 called "night" conforming to a test 30, and when, on the other hand, first control 7 for regulating the luminous intensity of the at least one legend 2 or of the at least one display 3, is placed in a position that corresponds to a controlled luminous intensity level ILcd for legend 2 or display 3, which is less than a predetermined luminous intensity threshold 25 ILthreshold conforming to a test 31.

The first and second controls 7, 8 can be combined to regulate the luminous intensity of one or more pieces of equipment. They can also be attached onto a principal element of a piece of equipment by which the luminous intensity of indicator lights and displays is controlled or can be offset relative to this piece of equipment.

Thus, in a piece of monitoring and control equipment 1 implementing the process according to the aspects of the disclosed embodiments, the luminous intensity of indicator lights 5a of luminous push-buttons 4 and/or of indicator lights 5b of selectors 6 can take three different predetermined values, even though these values are directly controlled by the pilots by means of only two positions 20, 22 called "day" and "night" of a control 8.

This process permits guaranteeing that the statuses of the functions controlled by luminous push-buttons 4 and selectors 6, statuses that can be displayed by means of indicator lights 5a incorporated in luminous push-buttons 4 or indicator lights 5b that are associated with selectors 6, will remain clearly visible and non-disruptive at the same time, which would not be the case if the luminous intensity of indicator lights 5a, 5b only had one threshold level in the "night" mode.

In particular, when control 8 with at least two positions for selecting the luminance of indicator lights 5a of push-buttons 4 and/or indicator lights 5b for selectors 6 is in position 20 called "day" according to test 30, the luminous intensity of said indicator lights 5a, 5b corresponds to the maximum value provided to guarantee a good readability of the state of these indicator lights even under conditions of daytime ambient luminosity. This luminous intensity, which corresponds to the luminance of indicator lights LV-day 21 defined for "day" mode 20, is independent of the position of control 7 for regulating the luminous intensity of legends 2 and displays 3. This independence is important since, under environmental conditions corresponding to daytime lighting conditions, or high luminosity of the cockpit, legends 2 and the read-outs of displays 3, which generally use reflective display technologies (i.e., display by direct reflection of the illuminating light by the front face of the display) or transflective display technologies (i.e. by conjoint use of transmission of the backlighting of the rear face and reflection of the ambient lighting by the front face), are most often readable even without particular illumination means and, consequently, the position of control 7 for continuous regulation of the luminous intensity of said legends 2 and of said displays 3 is relatively without effect on the readability of said legends and displays and can be found in a position corresponding to a very low luminous intensity level ILcd, including therein a value less than the threshold value ILthreshold 25 associated with switching the luminance of indicator lights 5 towards level LV-supernight 24, without this constituting any hindrance for the pilots and their activities. Now, for luminances LV-night 23 and LV-supernight 24, it would be very difficult to distinguish an illuminated state from an off state for indicator lights 5a, 5b in a luminous environment of the cockpit corresponding to that of daylight.

By application of the process, when the ambient luminosity decreases and becomes low enough, the pilots, in order not to be hindered by the now excessive luminous intensity of indicator lights 5a for luminous push-buttons 4 and/or indicator lights 5b of selectors 6, will instinctively position control switch 8 with at least two positions "day" 20 and "night "22" for regulating the luminous intensity of said indicator lights 5a, 5b, to the "night" 22 position. Due to these same reduced ambient luminosity conditions, the pilots will then regulate the luminous intensity level of legends 2 and displays 3 so these latter are correctly readable. If the ambient luminosity is moderated, regulating by the pilots will correspond to a relatively high level of controlled luminous intensity ILcd, greater than the ILthreshold 25, of legends 2 and of displays 3 and therefore the indicator lights 5a, 5b, in an illuminated state, of luminous push-buttons 4 and of selectors 6 will have the luminance LV-night 23 of the "night" mode 22. In contrast, if, due to a very dark ambience, the pilots decrease the controlled luminous intensity ILcd to a low value for legends 2 and displays 3, equal to or less than the predetermined threshold value ILthreshold 25, the luminous intensity of indicator lights 5a, 5b, in an illuminated state, of luminous push-buttons 4 and of selectors 6, will be reduced to correspond to the luminance value LV-supernight 24 of "night" mode 22.

In a symmetrical manner, on the one hand, when control 8 with two positions called "day" and "night" is in the "night" 22 position according to test 30, the luminance LV-supernight 24 of indicator lights 5a, 5b of luminous push-buttons 4 and of selectors 6 will be switched [changed], to assume the luminance value LV-night 23 when the pilots act on regulating control 7 to increase the luminous intensity of legends 2 and of displays 3 to a controlled value ILcd greater than a predetermined threshold value ILthreshold-sup 26, which can be equal to or different from the controlled luminous intensity threshold value ILthreshold 25 corresponding to switching the luminance in the direction of reducing the controlled luminous intensity ILcd, and, on the other hand, the luminance of indicator lights 5a, 5b of luminous push-buttons 4 and of selectors 6 will assume the value LV-day 21 corresponding to the condition "day" if control 8, with two positions called "day" and "night", is detected in the "day" position 20 according to test 30, and this is conducted independently of the position of control 7 for regulating the luminosity of legends 2 and displays 3, i.e., independently of the controlled luminous intensity value ILcd for these said legends and these said displays.

In order to prevent the luminous intensity of indicator lights 5a, 5b of luminous push-buttons 4 and of selectors 6 from being unstable when two-position control 8 is in position 22 called "night" and control 7 for continuous regulation of the luminous intensity of legends 2 and of displays 3 is in a position corresponding to a controlled luminous intensity value ILcd very near the threshold luminous intensity ILthreshold 25, i.e., in order to prevent the luminous intensity of said indicator lights 5a, 5b from oscillating in an unforeseeable manner between luminance LV-night 23 and luminance LV-supernight 24, it is preferable to retain two different values for the threshold luminous intensity according to which control 7 for continuous regulation of the luminous intensity of legends 2 and of displays 3 is activated in the direction of an increase of luminous intensity ILcd or in the direction of a reduction of luminous intensity ILcd of legends 2 and of displays 3. When control 7 for continuous regulation of the luminous intensity of legends 2 and of displays 3 is activated in the direction of a reduction of controlled luminous intensity ILcd, the luminance of indicator lights 5a, 5b of push-buttons 4 and of selectors 6 will go from the value LV-night 23 to the value LV-supernight 24, when the controlled value ILcd of the luminous intensity of legends 2 and of displays 3 reaches a first threshold value ILthreshold 25 conforming to test 31. In an equivalent manner, when control 7 for continuous regulation of the luminous intensity of legends 2 and of displays 3 is activated in the direction of an increase of controlled luminous intensity ILcd, the luminance of indicator lights 5a, 5b for luminous push-buttons 4 and selectors 6 will go from the value LV-supernight 24 to the value LV-night 23 when the controlled value ILcd of the luminous intensity of legends 2 and of displays 3 reaches a second threshold value, called ILthreshold-sup 26, conforming to test 32, which is greater than the first ILthreshold value.

Figure 2:
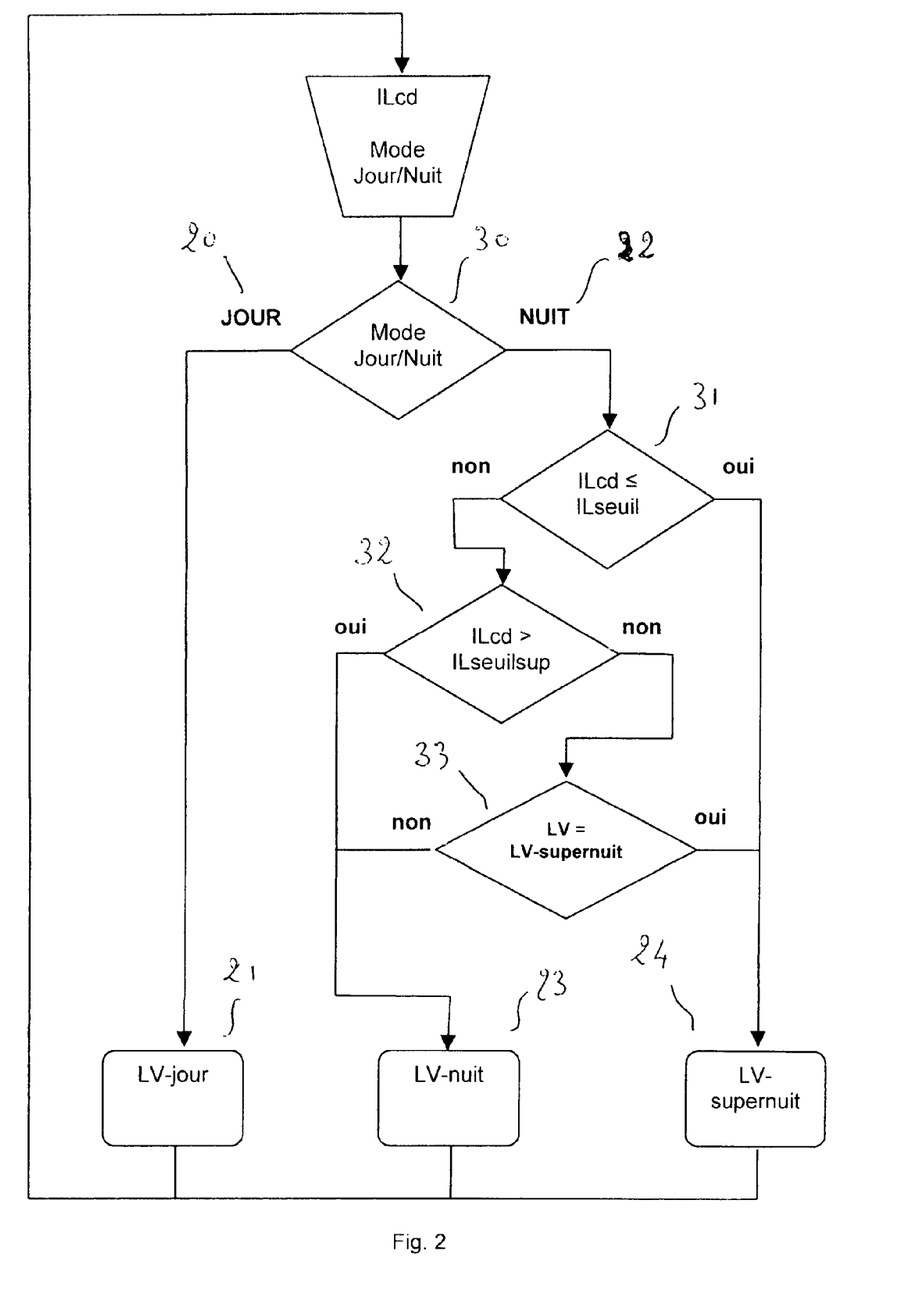
FIG. 2: flow chart of a preferred implementation of the process.
Figure 5:
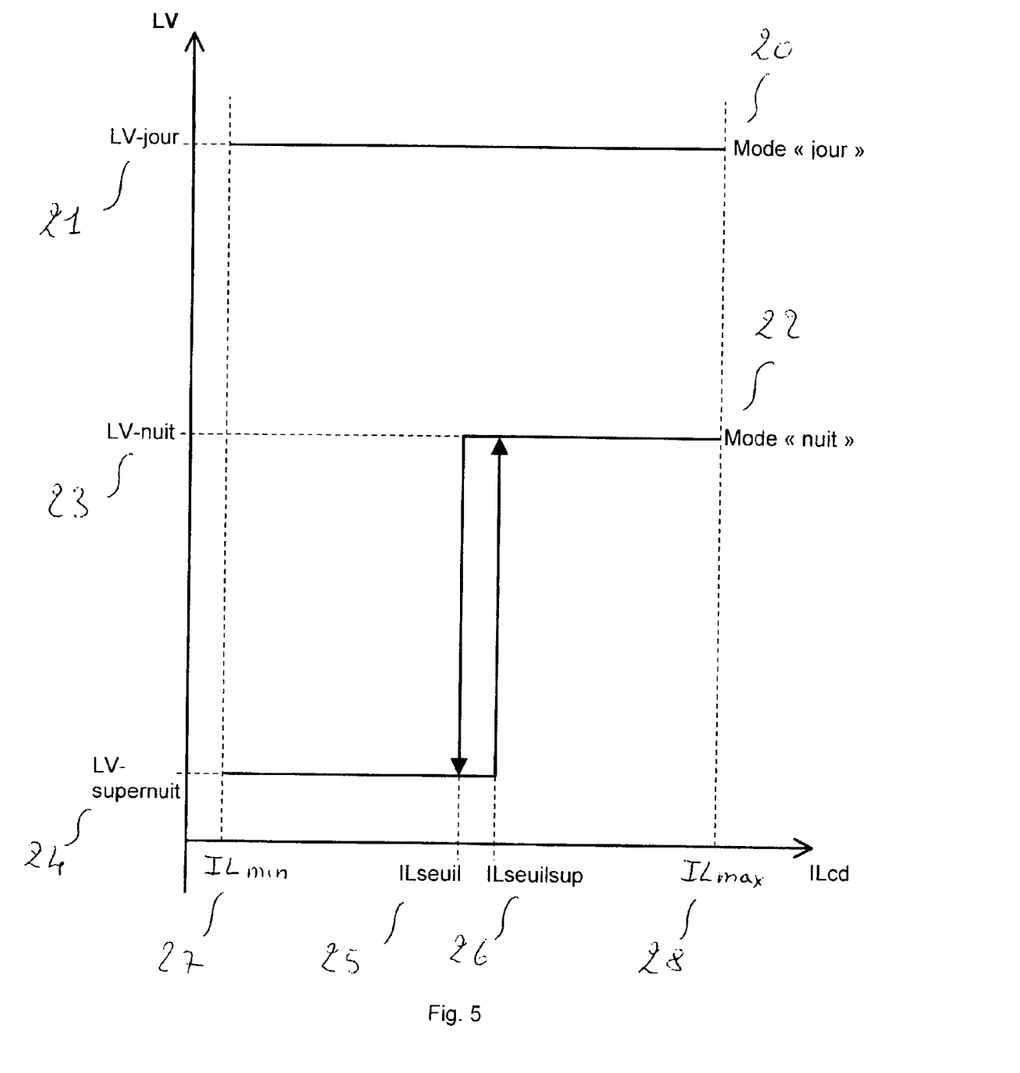
FIG. 5: example of variation of the luminance of indicator lights as a function of the luminous intensity value of the legends and displays, controlled by the means for regulating the intensity of said legends and said displays.

In one embodiment, presented in the example diagrammed in FIG. 2, the change in luminance of indicator lights 5a, 5b is produced abruptly when the value ILcd reaches the threshold value ILthreshold 25 or ILthreshold-sup 26 as a function of the direction of variation of control 7 for continuous regulation of the luminous intensity of legends 2 and of displays 3, i.e., by following a hysteresis cycle as illustrated in FIG. 5. When the controlled luminous intensity value ILcd is comprised between the two threshold values ILthreshold 25 and ILthreshold-sup 26, the luminance of indicator lights 5a, 5b for luminous push-buttons 4 and selectors 6 will keep the last value selected, i.e., LV-night 23 or LV-supernight 24, depending on the case, in agreement with test 33. If control 7 for continuous regulation of the luminous intensity of legends 2 and of displays 3 is in this situation, i.e., ILcd comprised between ILthreshold and ILthreshold-sup, although these values are relatively close, a priori, when the equipment is turned on, the choice of luminance made for indicator lights 5a, 5b of luminous push-buttons 4 and selectors 6 is arbitrary, for example, luminance LV-night 23.

In another embodiment, the change in the luminance of indicator lights 5a, 5b for luminous push-buttons 4 and selectors 6 is continuous and roughly linear between the two threshold values ILthreshold-sup 26 and ILthreshold 25, which remain, however, sufficiently close to one another to give the pilots, who change the regulation of the luminous intensity of legends 2 and of displays 3 by means of control 7 for regulating the luminosity of said legends and said displays, the impression of a clear but stable switching of the luminance of indicator lights 5a, 5b in an illuminated state, between luminances LV-night 23 and LV-supernight 24.

Figure 4:
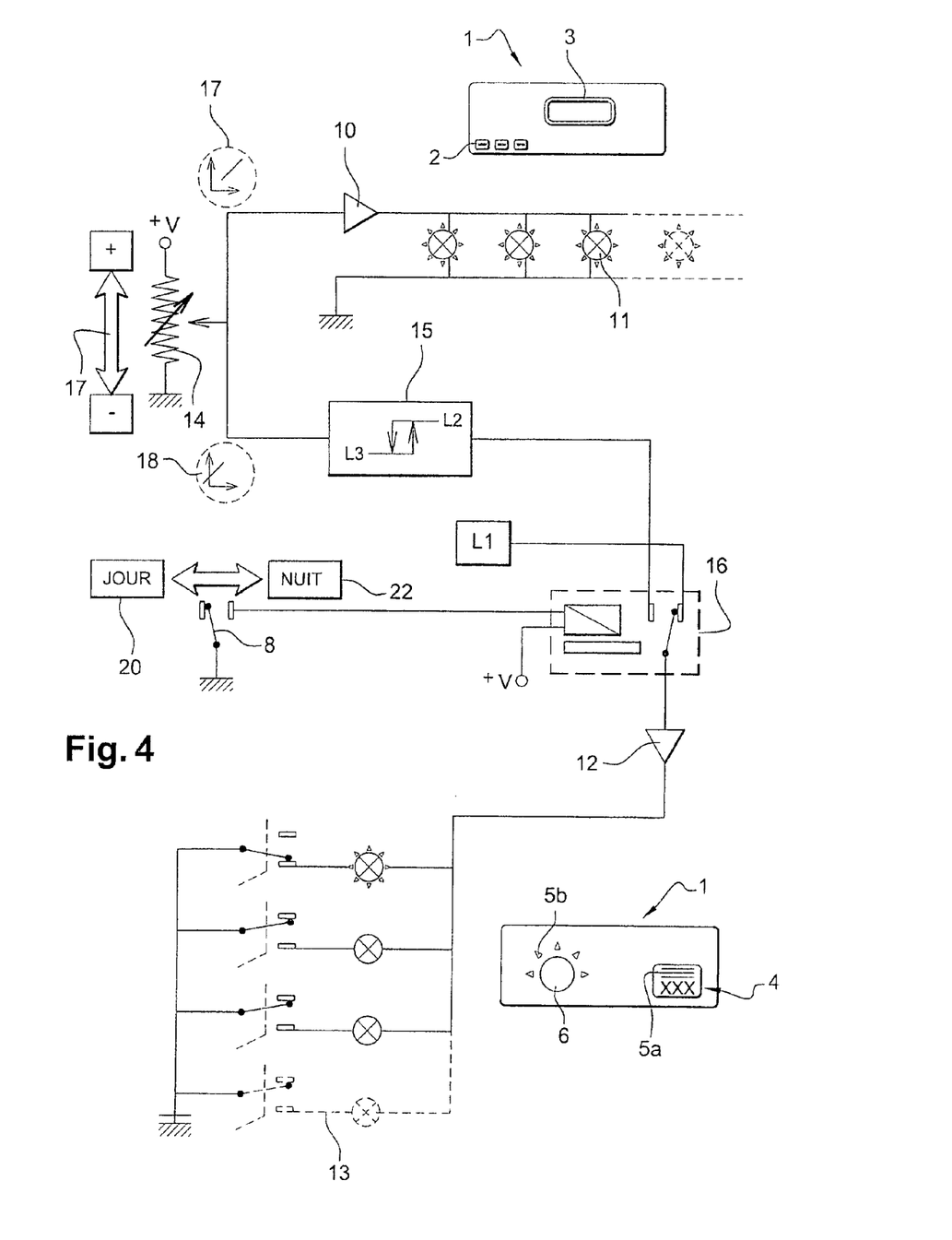
FIG. 4: diagram of the principle of an example of the device for regulating the luminance of indicator lights.

According to the aspects of the disclosed embodiments, a piece of monitoring and control equipment 1 of an airplane has:

at least one legend 2 or one display 3 that can be illuminated, in particular in order to be readable under relatively dark ambient luminous conditions;

at least one luminous indicator light 5a, 5b for monitoring that can be illuminated or turned off as a function of the status of a system to which it relates, such as an indicator light 5a of a luminous push-button 4 or an indicator light 5b of a selector 6;

at least one first control 7 for regulating, roughly continuously or with relatively small increments, the luminous intensity of the at least one legend 2 or the at least one display 3;

at least one second control 8, with at least two positions 20, 22, for selection of the luminous intensity of the at least one indicator light 5a, 5b between two modes of illumination corresponding to predefined luminous intensities when said at least one indicator light 5a, 5b is in an illuminated state;

electrical supply means 10, 12 for light sources 11, 13 used to illuminate the at least one legend 2 or the at least one display 3 and the at least one indicator light 5a, 5b.

First control 7 for regulating the luminous intensity, for example a thumbwheel, permits regulating the luminous intensity of the at least one legend or the at least one display 3, in a roughly continuous manner, between two extreme values of luminous intensities ILmax 28 and ILmin 27. Measurement means 14 activated by said first control 7, for example a potentiometer, generates a first signal 17, a voltage in the example of the potentiometer, representative of the position of said first control 7 and of a desired luminous intensity ILcd for the at least one legend 2 or for the at least one display 3 of the piece of monitoring and control equipment 1.

In a known way, this signal 17 is received by electric supply means 10, for example an amplifier or a variable electrical supply, which can supply at least one light source 11, associated with said legend 2 or said display 3, with electrical voltage and current, so that this legend 2 or this display 3 has the luminance corresponding to the desired value of luminous intensity ILcd that is defined by the position of first control 7 for regulating the luminous intensity.

Means associated with said first control 7 for regulating the luminous intensity of the at least one legend 2 or of the at least one display 3 also generate a second signal 18 representative of the desired luminous intensity value ILcd for said legend 2 or said display 3 of the piece of monitoring and control equipment 1. This second signal 18, by its form and its content, is sufficient to determine if the desired luminous intensity value ILcd for the at least one legend 2 or the at least one display 3 is greater than, less than or equal to at least one chosen threshold value for luminous intensity ILthreshold 25. This second signal 18 can be, for example, the same as the first signal 17 or even can be a different signal that delivers, for example, a discrete datum whose value, for example a reference voltage or an electric ground, depends on the position of control 7 and of the corresponding ILcd value relative to threshold value ILthreshold 25. For the example cited in which the first signal 17 corresponds to a variable voltage obtained by means of a potentiometer associated with first control 7, this variable voltage representative of ILcd can also serve for the second signal 18, which in this case will be transmitted to a voltage comparator 15 to be compared with a voltage representative of the ILthreshold value.

This second signal, after possible processing by processing means 15, to determine which of luminances LV-night 23 or LV-supernight 24 should be considered, is transmitted to electrical supply means 12, for example an amplifier or variable electrical supply, which can generate the voltages and currents necessary for light source or sources 13 associated with the at least one indicator light 5a, 5b for luminous push-button 4 or selector 6. When the signal received from processing means 15 or directly from measurement means 14 by electrical supply means 12 corresponds to a luminous intensity value ILcd controlled by first control 7 for regulating the luminous intensity of the at least one legend 2 or of the at least one display 3 greater than threshold value ILthreshold 25, this supply means receives a signal L2 that determines the voltages and currents to be supplied to light sources 13 so that indicator lights 5a, 5b for luminous push-button 4 or selector 6 illuminated by said light sources 13, have a first luminance LV-night 23. When the second signal received by electrical supply means 12 corresponds to a luminous intensity value ILcd controlled by first control 7 for regulating the luminous intensity of the at least one legend 2 or of the at least one display 3 less than or equal to the value ILthreshold 25, these supply means receive a signal L3 that determines the voltages and currents to be supplied to light sources 13, so that indicator lights 5a, 5b for luminous push-button 4 or selector 6, in the illuminated state, illuminated by said light sources 13, have a second luminance LV-supernight 24, less than the first luminance LV-night 23.

Second control 8 with at least two positions for selection of the luminous intensity of said at least one indicator light 5a, 5b acts on switching means 16, for example, a relay or static switch, which can switch the signal emitted by means of electrical supply 12 between the signal representative of the conditions applicable to "night" mode 22, L2 or L3 depending on the value of ILcd, a function of the position of means 7 for regulating the luminous intensity of legends 2 and of displays 3, and a signal L1 representative of mode "day" 20 in response to which electrical supply means 12 supplies the voltages and currents to light sources 13 designed to illuminate indicator lights 5a, 5b, so that indicator lights 5a, 5b of luminous push-button 4 or of selector 6, in the illuminated state, illuminated by said light sources 13, has a luminance LV-day 21.

When second control 8, with at least two positions for selecting the luminous intensity of the at least one indicator light 5a, 5b, is in position 20 called "day", switching means 16 switch the signal to be applied to electrical supply means 12 that supplies light sources 13 designed to illuminate the at least one indicator light 5a, 5b to signal L1 that corresponds to the electrical supply conditions permitting obtaining the desired luminance LV-day 21 under daylight conditions for said at least one indicator light 5a, 5b, when this at least one indicator light is in an illuminated state.

When second control 8, with at least two positions for selecting the luminous intensity of the at least one indicator light 5a, 5b, is in position 22 called "night", switching means 16 switches the signal to be applied to electrical supply means 12 that supplies light sources 13 designed to illuminate the at least one indicator light 5a, 5b to the signal emitted from means 7 for regulating the luminous intensity of legends 2 or of displays 3, or from means 15 for processing the signal emitted from said means 7, a signal which takes the values L2 or L3 that respectively correspond to electrical supply conditions permitting obtaining the desired luminance LV-night 23 or LV-supernight 24, under nighttime conditions for said at least one indicator light 5a, 5b, when this at least one indicator light is in an illuminated state.

The luminance of indicator lights 5a, 5b for luminous push-buttons 4 or selectors 6 under different lighting conditions for the cockpit generally requires experimental determination, taking into account the impact on these luminance values of the general arrangement of the cockpit and of the luminous emission surface of the indicator lights. Each indicator light or each category of indicator light can have luminances that are specific to it for each luminance level.

By way of example, for indicator lights 5a with a relatively large luminous emission surface such as those associated with luminous push-buttons 4, luminances of LV-day=100, LV-night=8 and LV-supernight=2 $cd/m^2$ can be retained for the different conditions considered. For indicator lights 5b with a smaller luminous emission surface, such as those associated with selectors 6, luminance values of LV-day=500, LV-night=25 and LV-supernight=10 $cd/m^2$, for the same set of different conditions, could be used.

What is claimed is:

1. A method for regulating a luminosity of at least one indicator light of a monitoring and control equipment for an airplane, when the at least one indicator light is in an illuminated state, the method comprising:

receiving an order from a first control for regulating, roughly continuously or with relatively small increments, a luminous intensity of at least one legend or at least one display of the monitoring and control equipment by setting a luminous intensity value (Ilcd) for the at least one legend or at least one display;

receiving an order from a second control for switching a luminous intensity of the at least one indicator light of the monitoring and control equipment between at least two modes corresponding to at least two distinct luminous intensity levels for said at least one indicator light, wherein, for at least one of the two modes, a different value is given to a luminance of the at least one indicator light depending on whether the luminous intensity value (Ilcd) setting of the at least one legend or of the at least one display is greater or less than a predetermined threshold value (Ilthreshold).

2. The method according to claim 1 wherein the luminance value of one indicator light is independent from the luminous intensity value (Ilcd) setting of the at least one legend or at least one display for one of the at least one of the at least two modes ordered by the second control.

3. The method according to claim 2 in which a luminance value of the one indicator light that is independent of the luminous intensity value (Ilcd) setting of the at least one legend or at least one display for the one of at least one of the at least two modes ordered by the second control, has a value greater than that of a luminance value of an other indicator light that depends on the luminous intensity value (Ilcd) setting for an other of the at least two modes ordered by the second control.

4. The method according to claim 1, further comprising that when the order from the second control is to switch to at least one of the at least two modes for which a different value is given to the luminance of the at least one indicator light, depending on whether the luminous intensity value (Ilcd) setting of said at least one legend or of the at least one display is greater or less than a predetermined threshold value (Ilthreshold), the luminance of the at least one indicator light takes a first value when the luminous intensity value (Ilcd) setting is greater than the threshold value (Ilthreshold), and takes a second value less than the first value when the luminous intensity value (Ilcd) setting is less than the predetermined threshold value (Ilthreshold).

5. The method according to claim 1, further comprising that when the order from the second control is to switch to at least one of the at least two modes for which a different value is given to the luminance of the at least one indicator light, depending on whether the luminous intensity value (Ilcd) setting of the at least one legend or of the at least one display controlled by the first control is greater than or less than the predetermined threshold value (Ilthreshold), when the luminous intensity value (Ilcd) setting is between a first luminance value and a second luminance value, a change of the luminance of the at least one indicator light is carried out when the predetermined threshold value (Ilthreshold) is reached and luminous intensity value (Ilcd) setting is modified in a direction of decrease, and a threshold value (ILthreshold-sup) different from the predetermined threshold value (Ilthreshold) is reached when the luminous intensity value (-Ilcd) setting is modified in the direction of decrease.

6. An airplane comprising at least one indicator light of at least one piece of monitoring and control equipment, the airplane using a luminosity regulation process to regulate a luminance of the at least one indicator light, wherein the monitoring and control equipment is configured to:
receive an order from a first control for regulating, roughly continuously or with relatively small increments, a luminous intensity of at least one legend or at least one display of the monitoring and control equipment;
receive an order from a second control for switching a luminous intensity of the at least one indicator light between at least two modes corresponding to at least two distinct luminous intensity levels for the at least one indicator light, wherein, for at least one of the two modes, a different value is given to a luminance of the at least one indicator light depending on whether a luminous intensity value (Ilcd) setting of the at least one legend or of the at least one display controlled by the first control is greater or less than a predetermined threshold value (Ilthreshold).

7. A piece of monitoring and control equipment for an airplane comprising:
at least one legend or at least one display that can be illuminated,
at least one indicator light having lighting means that can be illuminated or turned off,
means that are dedicated to said piece equipment or shared between two or more pieces of equipment, for regulating, roughly continuously or with relatively small increment values, a luminous intensity of the at least one legend or of the at least one display,
switching means that are dedicated to said piece of equipment or shared between two or more pieces of equipment, for switching between at least two states of luminous intensity of the at least one indicator light when said indicator light is in an illuminated state;
wherein variable electrical supply means are configured to supply lighting means of the at least one indicator light with voltages and currents that confer:
a first luminance to the at least one indicator light, which is roughly constant, when switching means are in a first state, and
a second luminance to the at least one indicator light, which is roughly constant, and is less than the first luminance, when switching means are in a second state, and the means for regulating the luminous intensity determines a luminous intensity (Ilcd) setting of the at least one legend of the at least one display that is greater than a predetermined threshold value (Ilthreshold), and
a third luminance to the at least one indicator light, which is roughly constant, and is less than the first luminance and the second luminance, when the switching means are in the second state, and the means for regulating the light intensity determine that the luminous intensity (Ilcd) setting of the at least one legend or of the at least one display that is less than the predetermined threshold value (Ilthreshold).

8. The piece of equipment according to claim 7 wherein the means for switching between the at least two luminous intensity states of the at least one indicator light when said at least one indicator light is in an illuminated state further comprises a selector with at least two positions called "day" and "night".

9. The piece of equipment according to claim 7 in which one of the at least one indicator light is incorporated in a luminous push-button.

10. The piece of equipment according to claim 7, in which a luminance value of each of the at least one indicator lights is between 2 $cd/m^2$ and 500 $cd/m^2$.

11. The piece of equipment according to claim 10 in which the luminance value of each of the at least one indicator light is roughly in a ratio of 5% to 10% for the second luminance relative to the first luminance and approximately 2% for the third luminance relative to the first luminance (21).

12. The piece of equipment according to claim 7, in which the luminance value of each of the at least one indicator light is configured to a luminous emission surface of each of the at least one indicator lights, so as to assure a homogenous luminous appearance of the visible face of the equipment.

13. An airplane comprising at least one piece of monitoring and control equipment (1) according to claim 7.

* * * * *

UNITED STATES PATENT AND TRADEMARK OFFICE
CERTIFICATE OF CORRECTION

| | | |
|---|---|---|
| PATENT NO. | : 7,639,154 B2 | Page 1 of 1 |
| APPLICATION NO. | : 11/613488 | |
| DATED | : December 29, 2009 | |
| INVENTOR(S) | : Thierry Bourret et al. | |

It is certified that error appears in the above-identified patent and that said Letters Patent is hereby corrected as shown below:

Column 10, line 66, delete "one of the at least one of the at least two" and insert --one of the at least two-- therefor.

Column 11, line 4-5 delete "one of the at least one of the at least two" and insert --one of the at least two-- therefor.

Column 11, line 34, in Claim 5, after "and" insert --the--.

Column 12, line 18, in Claim 7, after "which" insert --luminance--.

Column 12, line 22, in Claim 7, after "which" insert --luminance--.

Column 12, line 30, in Claim 7, after "which" insert --luminance--.

Column 12, line 57, in Claim 12, delete "lights," and insert --light,-- therefor.

Signed and Sealed this

Seventeenth Day of August, 2010

David J. Kappos
*Director of the United States Patent and Trademark Office*